(12) United States Patent
Chung (10) Patent No.: US 7,964,794 B2
(45) Date of Patent: Jun. 21, 2011

(54) SIDE-OPEN OUTLET BOX ARRANGEMENT

(76) Inventor: Charles N. Chung, South El Monte, CA (US)

( * ) Notice: Subject to any disclaimer, the term of this patent is extended or adjusted under 35 U.S.C. 154(b) by 304 days.

(21) Appl. No.: 12/001,677

(22) Filed: Dec. 11, 2007

(65) Prior Publication Data

US 2009/0145624 A1    Jun. 11, 2009

(51) Int. Cl.
*H01H 9/02* (2006.01)
*H02G 3/12* (2006.01)
(52) U.S. Cl. .............. 174/58; 174/50; 174/53; 174/481; 220/3.2; 220/3.3; 248/906
(58) Field of Classification Search .................. 174/480, 174/481, 50, 53, 57, 58, 61, 62, 63, 64, 559; 220/3.2–3.9, 4.02, 3.94; 248/906
See application file for complete search history.

(56) References Cited

U.S. PATENT DOCUMENTS

| | | | | |
|---|---|---|---|---|
| 1,133,946 A | * | 3/1915 | Farrell | 220/3.4 |
| 2,233,731 A | * | 3/1941 | Budnick | 248/906 |
| 2,552,400 A | * | 5/1951 | Brunia | 220/3.94 |
| 3,386,606 A | * | 6/1968 | Pastrick | 174/50 |
| 3,622,029 A | * | 11/1971 | Ware | 220/3.7 |
| 5,378,854 A | * | 1/1995 | Hoover | 174/53 |
| 5,703,327 A | * | 12/1997 | Jorgensen | 174/53 |
| 6,229,087 B1 | * | 5/2001 | Archer | 174/50 |
| 6,979,779 B2 | * | 12/2005 | Grady | 174/50 |
| 7,141,736 B2 | * | 11/2006 | Plankell | 174/50 |
| 7,214,875 B1 | * | 5/2007 | Gretz | 174/53 |

* cited by examiner

*Primary Examiner* — Angel R Estrada
(74) *Attorney, Agent, or Firm* — Raymond Y. Chan; David and Raymond Patent Firm

(57) ABSTRACT

An outlet box arrangement having an adjustable capacity for receiving electric outlets includes an outlet box having a side wall, a top wall and bottom wall extending therefrom defining an outlet socket. A top flange and bottom flange extending from the top wall and bottom wall, respectively, on which flange mounting holes are provided for enabling the outlet box to assemble with an outlet box cover for protecting the electric outlets installed in the outlet socket. Further, the outlet box is adapted to assemble with another in an edge-to-edge manner by securing the flange mounting holes of the two outlet boxes with fasteners, thereby expanding the outlet socket to receive additional electric outlets.

17 Claims, 5 Drawing Sheets

SIDE-OPEN OUTLET BOX ARRANGEMENT

BACKGROUND OF THE PRESENT INVENTION

1. Field of Invention

The present invention relates to an outlet box having sides opened, and more particularly to an outlet box arrangement comprising a plurality of the side-open outlet boxes that may be combined in various manners to accommodate various needs for electric outlets installation.

2. Description of Related Arts

Outlet boxes are widely used in constructions and home improvements. Conventionally, an outlet box is composed of a metal box defining a receiving space with a front opening, through which electric outlets may be disposed in the receiving space. Mounting holes are so provided to the outlet box and electric outlets, correspondingly and respectively, that the electric outlets may be affixed to the outlet box with its sockets uncovered. The outlet box may include knockout holes that are susceptible to an impact force to form a through knockout hole on the side walls of the outlet box for facilitating wiring of the electric outlets. Such outlet box can be found in U.S. Pat. No. 5,823,821 to Tohanczyn, Jr. on Oct. 20, 1998.

In the course of installation of electric outlets, the outlet box with through knockout holes formed on its side walls is mounted to a wall stud with brackets. A set of electric outlets is affixed to the outlet box by fasteners securing through their respective mounting holes. Electric wires are managed enter the outlet box through the knockout holes for connecting the electric outlets to power sources. Usually, the wall finishes are done in flush alignment with the opening of the outlet box. Thereafter, a front cover may be attached to the outlet box for covering its opening while exposing the electric outlets.

One drawback of the conventional outlet box is the difficulty of arranging the wires to go through the knockout holes into the outlet box and connect them with the electric outlets. Connecting the electric outlets to the wire is somewhat inconvenient because the front opening of the outlet box is the only access, through which the connection job may be done, and it therefore does not provide adequate space for connecting the wires with the electric outlets. Thus, it happens very often that the wiring of the electric outlets is done before they are mounted to the outlet box. This causes another difficulty of wiring, because the wiring is done in a manner that the electric outlets are unsupported.

Another drawback of the conventional outlet box is its inability of expanding the capacity of receiving various numbers and sizes of electric outlets. The conventional outlet box has its top, bottom, left, right and back walls integrally formed with the front opening left for access into the receiving space defined by the walls. Therefore, its capacity of receiving electric outlets is fixed and cannot be expanded. This creates a problem when a location requires a number of electric outlets more than that the outlet box is able to contain. A conventional solution is to arrange two or more outlet boxes in a side-by-side manner to accommodate the excessive number of electric outlets. This arrangement, however, makes the wiring very difficult due to the barriers of the side walls as the wires are managed to go into the receiving space of each outlet box. Moreover, much effort is needed to arrange two outlet boxes in a side-by-side manner for lack of mounting designs to connect them together.

Thus, what is needed is an outlet box that can ease the installation of electric outlets and expand its capacity of receiving various numbers and sizes of electric outlets.

SUMMARY OF THE PRESENT INVENTION

An objective of the present invention is to provide an outlet box arrangement which comprises an outlet box having various parts that can be secured in various arrangements in order to adjust its capacity of receiving electric outlets.

Another objective of the present invention is to provide an outlet box arrangement, wherein the outlet box has a side wall, top wall and bottom wall to define an outlet socket with a side opening, front opening, and back opening for receiving the electric outlets in the outlet socket therethrough so as to ease installation of the same.

Another objective of the present invention is to provide an outlet box arrangement, which comprises an outlet box cover adapted to assemble with the outlet box for covering the side opening and back opening, thereby protecting the electric outlets therein.

Another objective of the present invention is to provide an outlet box arrangement, wherein the outlet box has a top flange and bottom flange with flange mounting holes for enabling one outlet box to assemble with another in a edge-to-edge manner by securing the flange mounting holes of the two outlet boxes with fasteners to expand the capacity of receiving the electric outlets.

Another objective of the present invention is to provide an outlet box arrangement, wherein the outlet box has a depth indicator provided on its top wall and/or bottom wall for indicating a relative position of the outlet box and its supporter for flush mounting of the same.

Another objective of the present invention is to provide an outlet box arrangement, which comprises at least two gang adders to respectively affix to the top and bottom walls of the outlet box, and a divider adapted to be disposed between the gang adders and outlet box in order to expand the capacity of receiving electric outlets.

Accordingly, in order to accomplish the above objects, the present invention provides an outlet box arrangement for mounting at least an electric outlet on a supporter, comprising an outlet box having a mounting sidewall adapted for securely mounting on the supporter, a top wall extending from a top edge of the mounting sidewall and a bottom wall extending from a bottom edge of the mounting side wall, and defining an outlet socket within the mounting side wall, the top wall and the bottom wall, for receiving the electric outlet therein. Therefore, by detachably attaching two or more outlet boxes with each other in an edge-to-edge manner, the outlet boxes are selectively expanded to constitute two or more electric sockets for respectively receiving additional electric outlets.

These and other objectives, features, and advantages of the present invention will become apparent from the following detailed description, the accompanying drawings, and the appended claims.

DETAILED DESCRIPTION OF THE PREFERRED EMBODIMENT

Figure 1:
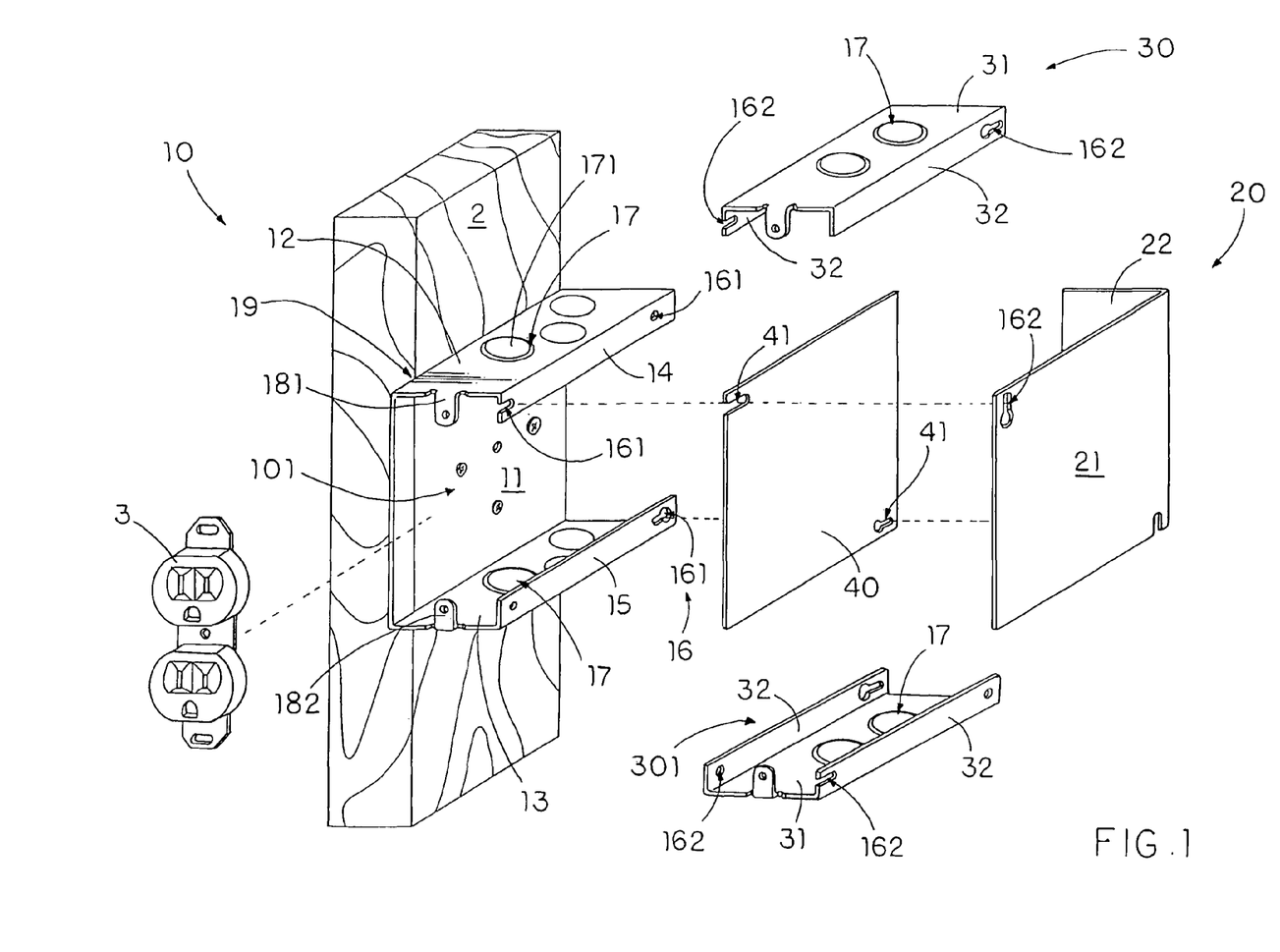
FIG. 1 is an exploded perspective view of an outlet box arrangement according to a preferred embodiment of the present invention.
Figure 2:
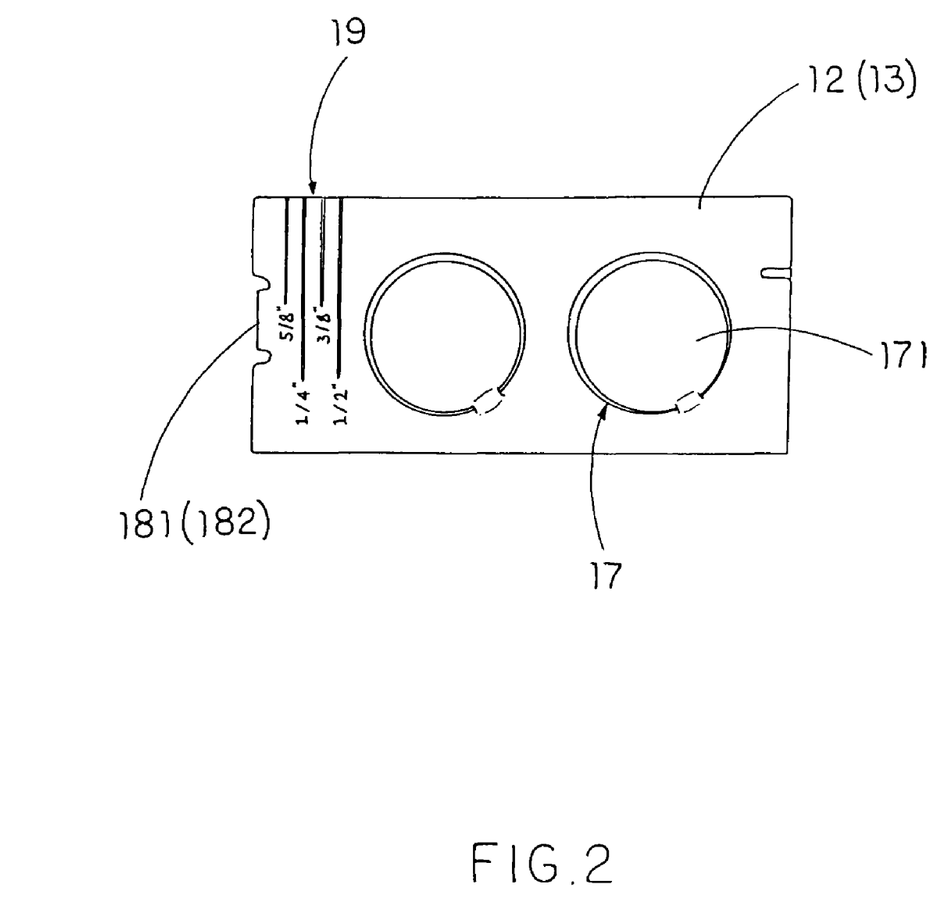
FIG. 2 is a top view of the outlet box arrangement according to the above preferred embodiment of the present invention.

Referring to FIGS. 1 and 2 of the drawings, an outlet box arrangement according to a preferred embodiment of the present invention is illustrated, wherein the outlet box arrangement is adapted for receiving an electric outlet 3 therein and mounting on a supporter 2, such as a metal stud disposed in a wall. While the capacity of the outlet box arrangement is adjustable by various combinations of parts for receiving various numbers of electric outlets, this embodiment propose an arrangement that comprises an outlet box 10 and its respective outlet box cover 20.

The outlet box 10, having a U-shaped cross section, has a mounting sidewall 11, a top wall 12 extending from the top edge of mounting sidewall 11 and a bottom wall 13 extending from the bottom edge of mounting sidewall 11. The mounting sidewall 11 has a plurality of mounting holes 111, through which it is affixed to the support 2 with fasteners, such as screws, bolts and nails. The top wall 12 and bottom wall 13 extend at the same side with respective to the mounting sidewall 11 to define an outlet socket 101 with a front opening, back opening and side opening, through which the electric outlet 3 can be installed therein. Because the outlet socket 101 is widely accessible through the front opening, side opening and back opening, the electric outlet 3 is easily to be installed and the wiring of the same can be done without much difficulty.

The outlet box cover 20 has a side portion 21 and a back portion 22 integrally extending from the back edge of side portion 21, constituting an L-shaped configuration. The side portion 21 is of substantially similar size to the side opening of outlet socket 101 and the back portion 22 is of substantially similar size to the back opening of the same, so that the outlet box cover 20 is adapted for covering the side and back openings and leaving the front opening of outlet socket 101 uncovered. Thus, the outlet box cover 20 is capable of protecting the electric outlet installed in the outlet socket 101, while exposing the same through the front opening to outside.

In other words, the outlet box cover 20, having a L-shaped cross section, having the side portion 21 detachably attached to the side edges of the top and bottom walls 12, 13 of the outlet box 10 to enclose the side opening thereof and the back portion 22 integrally extended from the side portion 21 covering at the back opening of the outlet socket 101, in such a manner that the front opening of the outlet box 10 is remained uncovered for allowing the electric outlet 3 mounted thereat to communicate with outside.

The outlet box 10 comprises a top flange 14 downwardly extending along the outer side edge of the top wall 12 and a bottom flange 15 upwardly extending along the outer side edge of bottom wall 13 such that the side opening of outlet socket 101 is further defined therebetween. The outlet box 10 further comprises means 16 for detachably mounting the top and bottom flanges 14, 15 to the outlet box cover 20 to cover the side opening of the outlet box 10.

The mounting means 16 contains first mounting holes 161 respectively formed on the top flange 14 and the bottom flange 15 and corresponding second mounting holes 162 formed on the outlet box cover 20 to align with the first mounting holes 161 such that when the outer box cover 20 is mounted to the outlet box 10, fasteners are used to detachably mount the top and bottom flanges 14, 15 to the outlet box cover 20. In other words, the outlet box cover 20 is able to assemble with the outlet box 10 by securing the second mounting holes 162 and the first mounting holes 161 with fasteners.

The first mounting holes 161 are made in various shapes. One is simply a round hole. Another is a two-size mounting hole constituted of a wider portion and narrower portion for accommodating various sizes of fasteners. The other is an elongated mounting hole along which the fastener is capable of being disposed at various positions. Likewise, the second mounting holes 162 are shaped as a two-size mounting hole and elongated mounting hole, respectively, in correspondence with the first mounting holes 161.

As shown in FIGS. 1 and 2, the outlet box 10 further has at least a knockout hole 17 formed at one of the top and bottom walls 12, 13 of the outlet box 10 to communicate the outlet socket 101 to outside, wherein the knockout hole 17 is adapted for allowing electric cables extending into the outlet socket 101 to electrically connect with the electric outlet 3 from outside.

Accordingly, there is a plurality of knockout holes 17 spacedly formed on the top wall 12 wherein each of the knockout holes 17 is constituted of a knockout cover 171 whose circumference is partially cut into the top wall 12 with at least a portion still attached to it. Thus, the knockout cover 171 is susceptible to an impact force to detach from the top wall 12 to form the knockout hole 17 through the top wall 12, thereby allowing cables of power sources extending into the outlet box 10 therethrough for connecting to the electric outlet 3. Likewise, the knockout holes 17 are formed on the bottom wall 13 in the same manner as those formed on the top wall 12 for facilitating wiring of electric outlets 3.

The outlet box 10 further comprises a top outlet mounting tab 181 transversely extending from the front edge of top wall 12 toward the bottom wall 13 and a bottom outlet mounting tab 182 transversely extending from the front edge of bottom wall 13 toward the top wall 12. Tab mounting holes are provided on the top outlet mounting tab 181 and bottom outlet mounting tab 182, respectively. Thus, the electric outlets 3 that have holes corresponding to the tab mounting holes can be easily affixed to the top and bottom outlet mounting tabs 181 and 182 with fasteners.

A depth indicator 19 is provided on the top wall 12 for indicating the relative position of the outlet box 10 and supporter 2. When the outlet box 10 is mounted on the supporter 2, the depth indicator 19 indicates the relative positions between the front edge of top wall 12 and the supporter, such that the wall finish covering the supporter 2 may be done accordingly for flush mounting the outlet box 10 with the same. Likewise, the depth indicator 19 can also be provided on the bottom wall 13 in the same manner as that on the top wall 12 for helping to flush mount the outlet box 10 with the wall finish covering the supporter 2.

While the present outlet box 10 is introduced as having many parts and walls, they may be manufactured integrally. The manufacturing process may be started from a piece of square-shaped metal with predefined protruded areas for later being formed into the top and bottom outlet mounting tabs 181 and 182. The top and bottom areas of the piece of metal are bent along the same direction to form the top wall 12 and bottom wall 13. The end areas of the top wall 12 and bottom wall 13 are further bent to form the top flange 14 and the bottom flange 15 respectively. The predefined protruded areas are bent toward one another so as to from the top and bottom outlet mounting tabs 181 and 182. The first mounting holes 161 may be precut by mean of a mold pouching on the piece of metal. The knockout holes 17 may be formed in the same manner as the first mounting holes 161, except that the pouching force applied on the metal is smaller than that for the first mounting holes 161, so that the knockout cover 171 may remain on the top wall 12 susceptible to an impact force to detach therefrom. Likewise, the outlet box cover 20 may be manufactured out of an integral piece of metal that is bent along the back edge of side portion 21 to form the back portion 22 and the side portion 21. The second mounting holes 162 may be precut by means of a mold pouching on the piece of metal. Thus, the outlet box 10 and the outlet box cover 20 can be manufactured with low costs due to their simple manufacturing processes.

The outlet box arrangement further comprises two gang adders 30, which defines an additional outlet socket 301 therebetween, detachably mounted to the top and bottom walls 12, 13 of the outlet box 10 respectively in an edge to edge manner, wherein the gang adders 30 are mounted between the outlet box 10 and the side portion 21 of the outlet box cover 20 while the additional outlet socket 301 is communicating with the outlet socket 101 so as to expand the outlet socket 101 of the outlet box 10.

Each of the gang adders 30 comprises an elongated plate 31 and two side flanges 32 transversely extending from the two side edges of elongated plate 31 respectively. Accordingly, the gang adders 30 are detachably mounted to the outlet box 10 via the mounting means 16. The second mounting holes 162 are formed on the left two side flange 32 at in alignment with the first mounting holes 161 of outlet box 10 and the second mounting holes 162 of the outlet box cover 20. As a result, the gang adders 30 are adapted to be mounted between the outlet box 10 and the outlet box cover 20 with fasteners secured through the first and second mounting holes 161, 162 to form the additional outlet socket 301 between the outlet box 10 and the outlet box cover 20, thereby expending the capacity of the outlet box arrangement for receiving electric outlets 3.

According to the preferred embodiment, at least one knockout hole 17 is formed on the elongated plate 31 of one of the gang adders 30 for allowing wires of power sources extending into the additional outlet socket 301 through the knockout hole 17 to electrically connect to the electric outlet 3 within the additional outlet socket 301.

It is noted that the present outlet box arrangement can be further expended by adding more gang adders 30 in an edge-to-edge manner while the length of back cover may vary according to its application based on the numbers of the gang adders 30 used. Thus, the present outlet box arrangement is capable of accommodating various numbers of electric outlets 3 and the whole outlet socket may be divided according desirable fashions.

The outlet box arrangement further comprising a cavity divider 40 detachably attached between the top and bottom walls 12, 13 of the outlet box 10 to separate the outlet socket 101 of the outlet box 10 from the additional outlet socket 301 of the two gang adders 30.

The cavity divider 40 is adapted for detachably mounting between the outlet box 10 and gang adders 30 in an edge-to-edge manner. When the outlet box 10 and gang adders 30 are attached to one another with the cavity divider 40 mounted in between, the outlet socket 101 of outlet box 10 and the additional outlet socket 301 formed by the gang adders 30 are blocked from communicating with one another therethrough. Accordingly, the cavity divider 40 has at least two through holes 41 spacedly formed thereon to substantially align with the first and second mounting holes 161, 162, so that the gang adders 30 are securely sandwiched between the cavity divider 40 and the outlet box 10 when the gang adders 30 are mounted to the outlet box 10 via the mounting means 16.

This present outlet box arrangement has the advantage of ease of installation of the electric outlets 3, comparing with conventional outlet boxes. Because of the outlet socket 101 is accessible through the front opening, back opening and side opening, an electric technician can easily affixed the electric outlets 3 onto the top and bottom outlet mounting tabs 181, 182, and complete the wiring through the knockout holes 17 without inconvenient interference caused by the side and back walls of conventional outlet boxes. After the electric outlets are installed, the outlet box cover 20 can be mounted to the outlet box 10 to cover the side opening and back opening for protection of them in the outlet socket 101.

Another advantage of the present outlet box is its adjustable capacity of receiving outlet boxes in a modulized way. Such advantage may be better understood with reference to the following embodiments.

Figure 3:
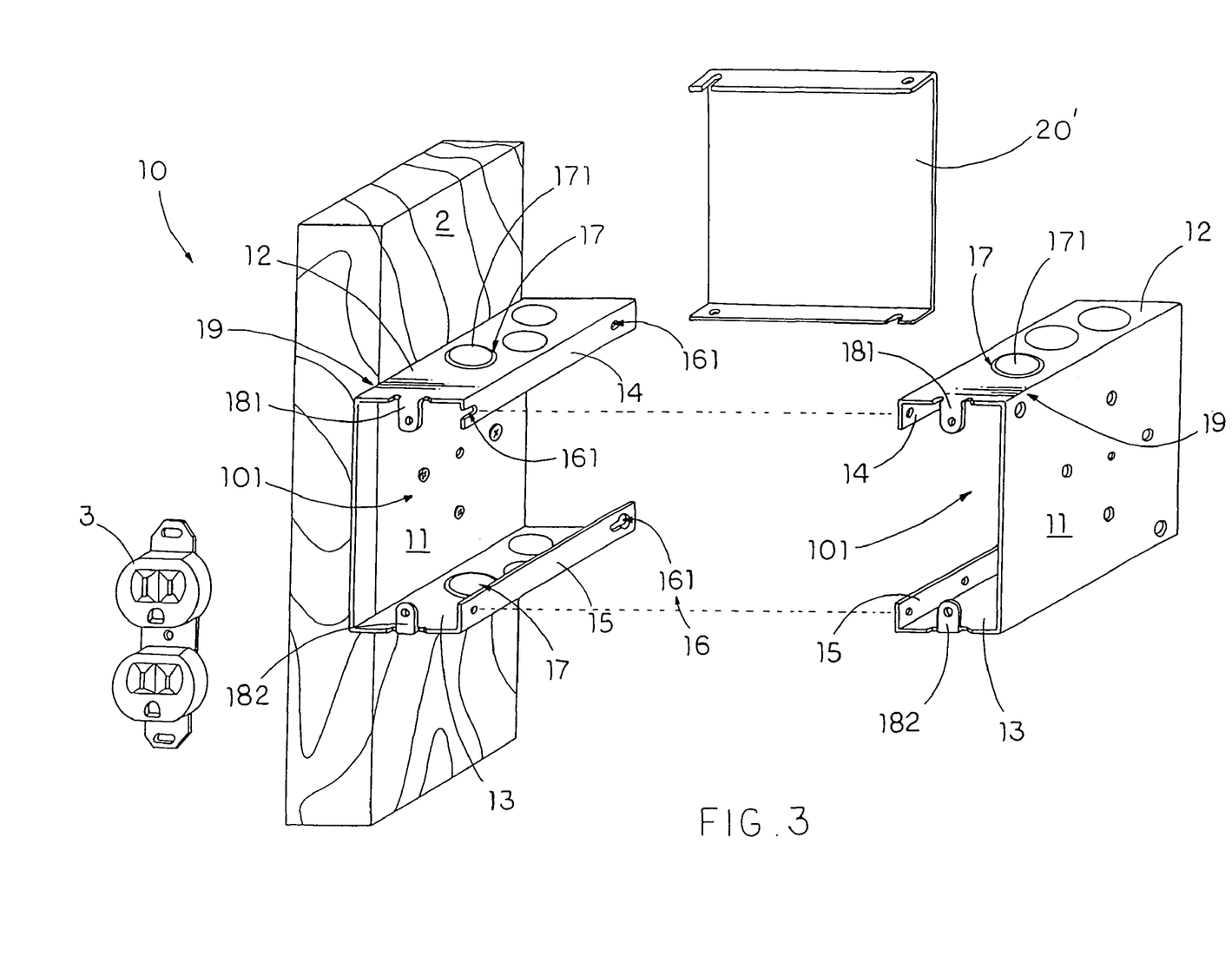
FIG. 3 is an exploded perspective view of the outlet box arrangement according to the above preferred embodiment of the present invention, illuminating two outlet boxes being attached with each other.

Referring to FIG. 3, an outlet box arrangement is adapted to be selectively expand the outlet socket 101 for receiving two or more outlet outlets 3 therein by simply attaching two outlet boxes 10 with each other. Accordingly, the two outlet boxes 10 are detachably attached with each other in an edge-to-edge manner at the side openings of the outlet boxes 10 to communicatively expand the outlet boxes 10 so as to constitute said two outlet sockets 101 for respectively receiving additional electric outlets 3.

As shown in FIG. 3, the top walls 12 of the outlet boxes 10 are detachably mounted with each other and the bottom walls 13 of the outlet boxes 10 are detachably mounted with each other so as to detachably mount the outlet boxes 10 via the mounting means 16. In other words, the first mounting holes 161 of the first outlet box 10 are align with the first mounting holes 161 of the second outlet box 10, such that they may be secured together with fasteners. As a result, the outlet sockets 101 of the outlet boxes 10 are added together as an expanded one that is capable of receiving more electric outlets 3 than a single outlet box 10. A back cover 20' is shaped and sized to detachably and fitly mount to back edges of mounting sidewall 11, top and bottom walls 12, 13 of the two outlet boxes 10 when they are attached to one another to cover the back opening of expanded outlet socket 101. Thus, the present outlet box arrangement has an advantage of accommodating various numbers of outlet boxes 10 by simply combining two outlet boxes 10 together as suppose to a conventional one whose capacity of receiving electric outlets may not be flexibly adjustable.

Figure 4:
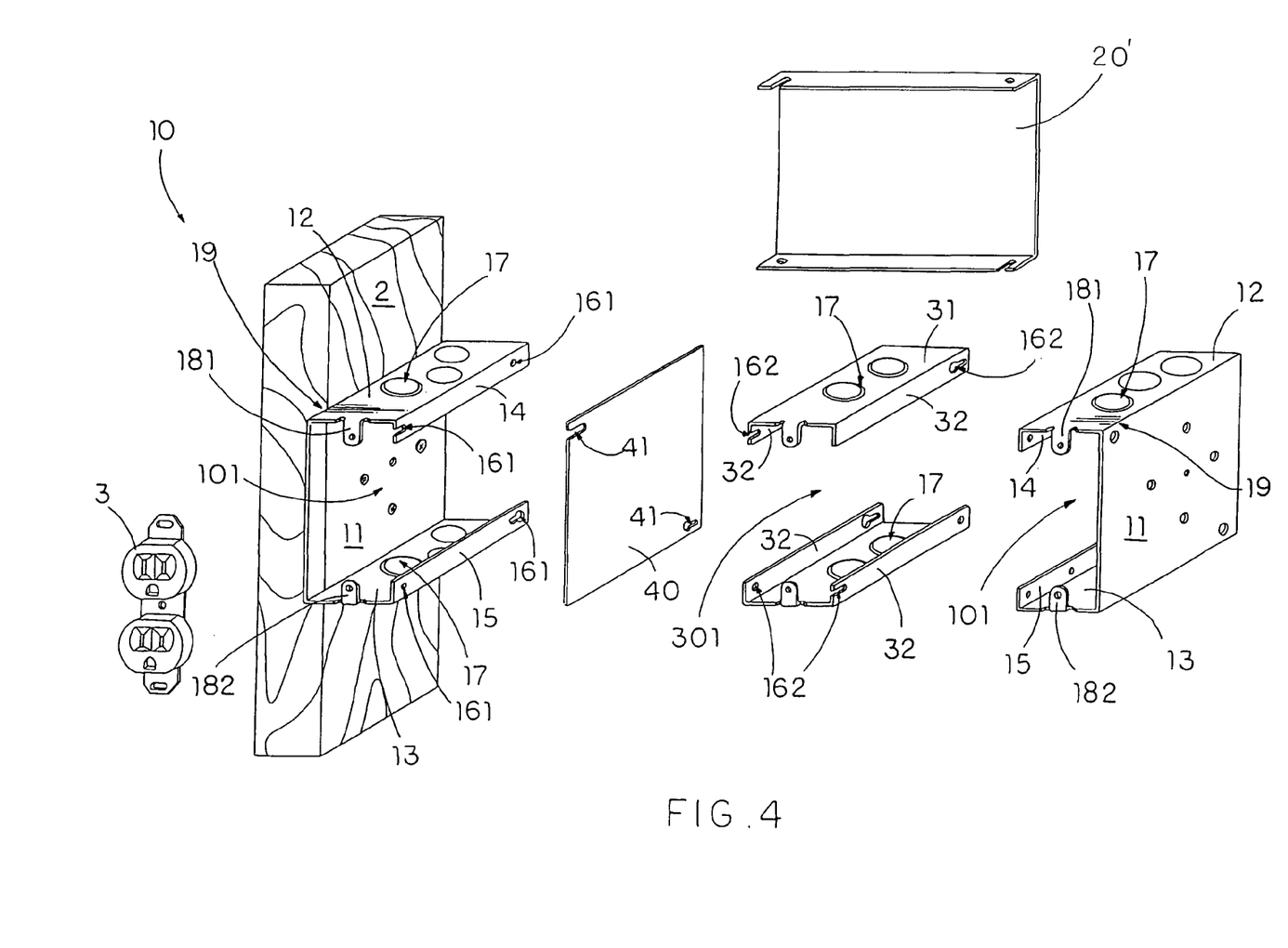
FIG. 4 is an exploded perspective view of the outlet box arrangement according to the above preferred embodiment of the present invention, illuminating two gang adders being attached between two outlet boxes.

As shown in FIG. 4, the outlet box arrangement is adapted to further expand its size for receiving more electric outlets 3. Accordingly, the gang adders 30 are mounted between the two outlet boxes 10 while the additional outlet socket 301 is communicating with the outlet sockets 101 so as to expand the outlet sockets 101 of the outlet boxes 10.

In addition, the cavity divider 40 is detachably attached between the top and bottom walls 12, 13 of the outlet boxes 10 to separate the outlet sockets 101 of the outlet boxes 10 from the additional outlet socket 301 of the two gang adders 30.

Figure 5:
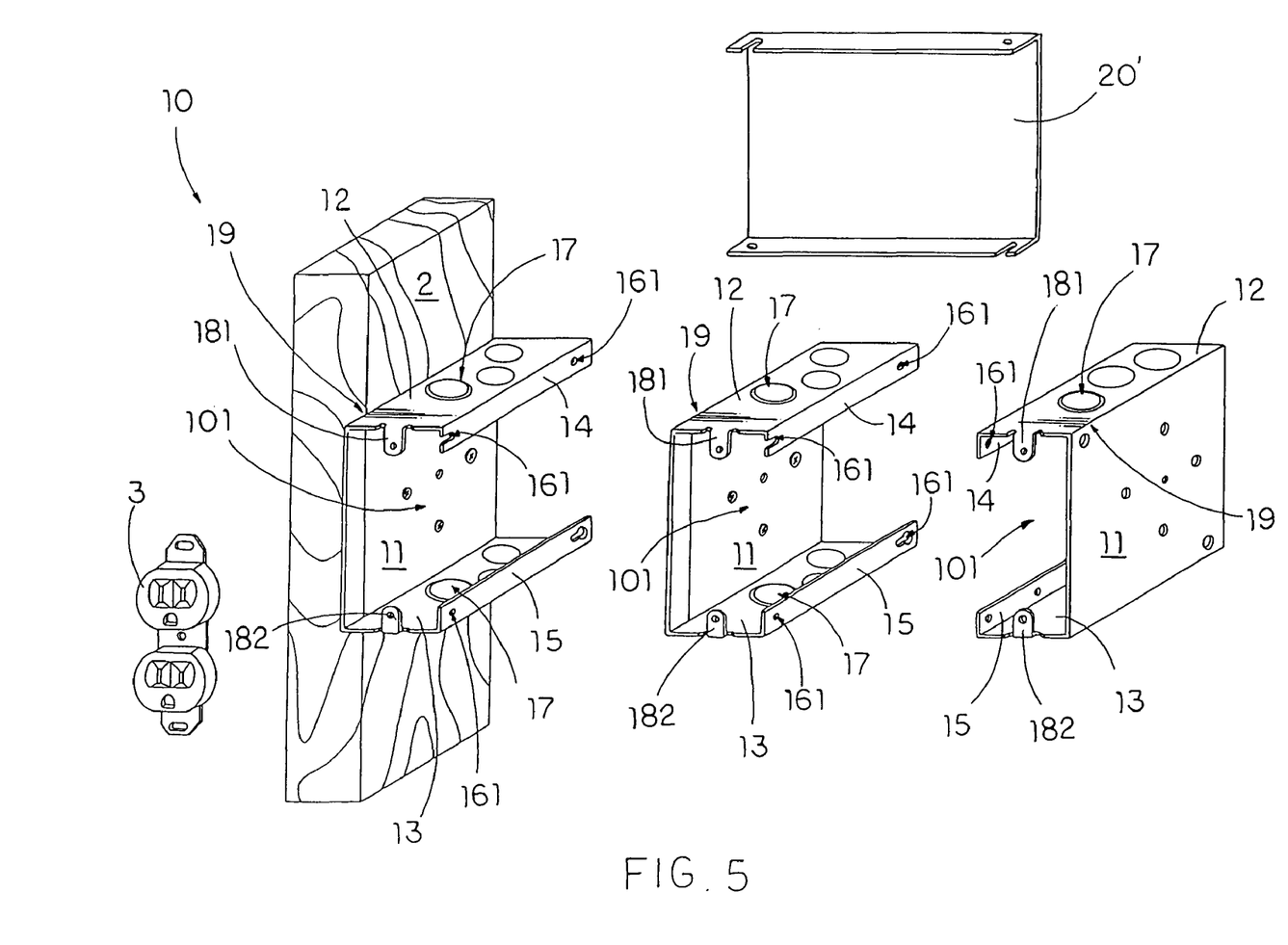
FIG. 5 is a perspective view of the outlet box arrangement according to the above preferred embodiment of the present invention, illuminating three outlet boxes being attached with each other.

It is obvious that the outlet box arrangement is selectively adjusted its size by attaching three outlet boxes 10 with each other to substantially expand the outlet sockets 101, as shown in FIG. 5.

Furthermore, because the present outlet box arrangement whose parts are modulized with aligning mounting holes provided, they can be easily mounted in various combinations with fasteners secure through those mounting holes. Thus, the assembly of the arrangement is convenient and less time-consuming.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An outlet box arrangement for mounting at least an electric outlet on a supporter, comprising:
an outlet box having a mounting sidewall adapted for securely mounting on said supporter, a top wall extending from a top edge of said mounting sidewall and a bottom wall extending from a bottom edge of said mounting side wall, and defining an outlet socket within said mounting side wall, said top wall and said bottom wall, for receiving said electric outlet therein, wherein said outlet box defines a side opening between two side edges of the top and bottom walls to communicate with said outlet socket, and a front opening for allowing said electric outlet mounted thereat to communicate with outside; and
an outlet box cover, having a L-shaped cross section, having a side portion detachably attached to said side edges of said top and bottom walls of said outlet box to enclose said side opening thereof and a back portion integrally extended from said side portion covering at a back opening of said outlet socket, in such a manner that said front opening of said outlet box is remained uncovered for allowing said electric outlet mounted thereat to communicate with outside.

2. The outlet box arrangement, as recited in claim 1, further comprising two gang adders, which defines an additional outlet socket therebetween, detachably mounted to said top and bottom walls of said outlet box respectively in an edge to edge manner, wherein said gang adders are mounted between said outlet box and said side portion of said outlet box cover while said additional outlet socket is communicating with said outlet socket so as to expand said outlet socket of said outlet box.

3. The outlet box arrangement, as recited in claim 2, further comprising a cavity divider detachably attached between said top and bottom walls of said outlet box to separate said outlet socket of said outlet box from said additional outlet socket of said two gang adders.

4. The outlet box arrangement, as recited in claim 1, wherein said outlet box further comprises a top flange downwardly extended along said side edge of said top wall, a bottom flange upwardly extended along said side edge of said bottom wall, and means for detachably mounting said top and bottom flanges to said outlet box cover to cover said side opening of said outlet box.

5. The outlet box arrangement, as recited in claim 3, wherein said outlet box further comprises a top flange downwardly extended along said side edge of said top wall, a bottom flange upwardly extended along said side edge of said bottom wall, and means for detachably mounting said top and bottom flanges to said gang adders respectively.

6. The outlet box arrangement, as recited in claim 1, wherein said outlet box further has at least a knockout hole formed at one of said top and bottom walls of said outlet box to communicate said outlet socket to outside, wherein said knockout hole is adapted for allowing electric cables extending into said outlet socket to electrically connect with said electric outlet from outside.

7. The outlet box arrangement, as recited in claim 3, wherein said outlet box further has at least a knockout hole formed at one of said top and bottom walls of said outlet box to communicate said outlet socket to outside, wherein said knockout hole is adapted for allowing electric cables extending into said outlet socket to electrically connect with said electric outlet from outside.

8. The outlet box arrangement, as recited in claim 5, wherein said outlet box further has at least a knockout hole formed at one of said top and bottom walls of said outlet box to communicate said outlet socket to outside, wherein said knockout hole is adapted for allowing electric cables extending into said outlet socket to electrically connect with said electric outlet from outside.

9. The outlet box arrangement, as recited in claim 6, wherein said outlet box further comprises at least two mounting tabs extended from said top and bottom walls at said front opening of said outlet box for securely mounting said electric outlet within outlet socket.

10. The outlet box arrangement, as recited in claim 7, wherein said outlet box further comprises at least two mounting tabs extended from said top and bottom walls at said front opening of said outlet box for securely mounting said electric outlet within outlet socket.

11. The outlet box arrangement, as recited in claim 8, wherein said outlet box further comprises at least two mounting tabs extended from said top and bottom walls at said front opening of said outlet box for securely mounting said electric outlet within outlet socket.

12. An outlet box arrangement for mounting at least an electric outlet on a supporter, comprising:
at least two outlet boxes, each of which having a mounting sidewall adapted for securely mounting on said supporter, a top wall extending from a top edge of said mounting sidewall and a bottom wall extending from a bottom edge of said mounting side wall, and defining an outlet socket within said mounting side wall, said top wall and said bottom wall, for receiving said electric outlet therein, and a side opening between two side edges of the top and bottom walls to communicate with said outlet socket, wherein said outlet boxes are detachably attached with each other in an edge-to-edge manner at said side openings of said outlet boxes to communicatively expand said outlet boxes so as to constitute said two outlet sockets for respectively receiving additional electric outlets; and
two gang adders, which defines an additional outlet socket therebetween, detachably mounted to said top and bottom walls of said outlet box respectively in an edge to edge manner, wherein said gang adders are mounted between said two outlet boxes while said additional outlet socket is communicating with said outlet sockets so as to expand said outlet sockets of said outlet boxes.

13. The outlet box arrangement, as recited in claim 12, further comprising a cavity divider detachably attached between said top and bottom walls of said outlet boxes to separate said outlet sockets of said outlet boxes from said additional outlet socket of said two gang adders.

14. The outlet box arrangement, as recited in claim 13, further comprising a back cover shaped and sized to detachably mount at rear sides of said outlet boxes to cover a back opening thereof.

15. The outlet box arrangement, as recited in claim 14, wherein each of said outlet boxes further has at least a knockout hole formed at one of said top and bottom walls of said outlet box to communicate said respective outlet socket to outside, wherein said knockout hole is adapted for allowing electric cables extending into said outlet socket to electrically connect with said electric outlet from outside.

16. The outlet box arrangement, as recited in claim 14, wherein each of said outlet boxes further comprises at least two mounting tabs extended from said top and bottom walls at said front opening of said outlet box for securely mounting said electric outlet within outlet socket.

17. The outlet box arrangement, as recited in claim 15, wherein each of said outlet boxes further comprises at least two mounting tabs extended from said top and bottom walls at said front opening of said outlet box for securely mounting said electric outlet within outlet socket.

* * * * *